US006192942B1

(12) United States Patent
Hsich et al.

(10) Patent No.: US 6,192,942 B1
(45) Date of Patent: Feb. 27, 2001

(54) MULTI-LAYER TUBING ASSEMBLY FOR FLUID AND VAPOR HANDLING SYSTEMS

(75) Inventors: Henry S. Hsich, Rochester Hills, MI (US); Dean T. Su, Princeton Junction, NJ (US)

(73) Assignee: Hybritech Polymers, Mercerville, NJ (US)

(*) Notice: Subject to any disclaimer, the term of this patent is extended or adjusted under 35 U.S.C. 154(b) by 0 days.

(21) Appl. No.: 09/376,511

(22) Filed: Aug. 18, 1999

Related U.S. Application Data

(63) Continuation-in-part of application No. 09/326,719, filed on Jun. 7, 1999, which is a continuation-in-part of application No. 08/676,728, filed on Jul. 8, 1996, now Pat. No. 5,931,201, which is a continuation-in-part of application No. 08/593,068, filed on Jan. 29, 1996, now Pat. No. 5,934,336.

(51) Int. Cl.⁷ ...................................................... F16L 11/04
(52) U.S. Cl. .......................... 138/137; 138/141; 138/140; 138/DIG. 1
(58) Field of Search ..................................... 138/137, 140, 138/141, DIG. 1, DIG. 3, DIG. 7

(56) References Cited

U.S. PATENT DOCUMENTS

| | | | |
|---|---|---|---|
| 3,070,132 | * 12/1962 | Sheridan | 138/103 |
| 3,166,688 | * 1/1965 | Rowand et al. | 138/103 X |
| 3,473,087 | * 10/1969 | Slade | 138/103 |
| 3,561,493 | * 2/1971 | Maillard | 138/141 |
| 3,907,955 | * 9/1975 | Viennot | 264/165 |
| 4,643,927 | * 2/1987 | Luecke et al. | 428/36 |
| 4,706,713 | * 11/1987 | Sadamitsu et al. | 138/137 |
| 4,887,647 | * 12/1989 | Igarashi et al. | 138/126 |
| 5,038,833 | * 8/1991 | Brunnhofer | 138/137 |
| 5,076,329 | * 12/1991 | Brunnhofer | 138/137 |
| 5,142,782 | * 9/1992 | Martucci | 138/125 X |
| 5,170,011 | * 12/1992 | Martucci | 138/184 |
| 5,284,184 | * 2/1994 | Noone et al. | 138/121 |
| 5,383,087 | * 1/1995 | Noone et al. | 138/137 |
| 5,419,374 | * 5/1995 | Nawrot et al. | 138/137 |
| 5,460,771 | * 10/1995 | Mitchell et al. | 264/508 |
| 5,469,892 | * 11/1995 | Noone et al. | 138/121 |
| 5,524,673 | * 6/1996 | Noone et al. | 138/137 X |
| 5,554,425 | * 9/1996 | Krause et al. | 138/137 X |
| 5,566,720 | * 10/1996 | Cheney et al. | 138/137 |
| 5,653,266 | * 8/1997 | Reynolds | 138/137 |
| 5,726,247 | * 3/1998 | Michalczyk et al. | 525/102 |

FOREIGN PATENT DOCUMENTS

| | | |
|---|---|---|
| 0551094 | * 7/1993 | (EP) . |
| WO 9321466 | * 10/1993 | (WO) . |
| WO 9325835 | * 12/1993 | (WO) . |
| WO 9409303 | * 4/1994 | (WO) . |
| WO 9523036 | * 8/1995 | (WO) . |

OTHER PUBLICATIONS

Thermodynamically reversible and irreversible Control on Morphology of Multiphase Systems, Journal of Materials Science 25, Chapman and Hall, Ltd, 1990.*
Phase separation mechanism of rubber–modified epoxy, Journal of Materials Science 25, 1990.*
Morphology and Properties Control on Rubber–Epoxy Alloy Systems, Polymer Engineering and Science, May 1990.*
Phase Diagrams of Rubber–Modified Epoxies by Rayleigh–Brillouin Scattering and Thermodynamically Reversible and Irreversible Control on Morphology of Multiphase Systems, 34th International SAMPE Symposium, May 1989.*
Henry S. Hsich, "Morphology and Property Control via Phase Separation or Phase Dissolution During Cure in Multiphase Systems", pp. 186–203, 1990, Advances in Polymer Technology, vol. 10, No.3.

* cited by examiner

*Primary Examiner*—Patrick Brinson
(74) *Attorney, Agent, or Firm*—McEachran, Jambor, Keating, Bock & Kurtz

(57) ABSTRACT

This invention relates to a multi-layer tubing assembly for use in fuel-line application. The multi-layer tubing assembly comprises an extruded inner layer of thermoplastic, an adhesive layer coextruded around the inner layer and a cover layer of a multiphase polymer coextruded around the adhesive layer. The multiphase polymer forming the cover layer comprises 0.5% to 20% by weight compatibilizers and rheology modifiers.

51 Claims, No Drawings

MULTI-LAYER TUBING ASSEMBLY FOR FLUID AND VAPOR HANDLING SYSTEMS

This application is a continuation-in-part of copending application Ser. No. 09/326,719 filed on Jun. 7, 1999, which is a continuation-in-part of Ser. No. 08/676,728 filed on Jul. 8, 1996, now U.S. Pat. No. 5,931,201, which is a continuation-in-part of Ser. No. 08/593,068, filed on Jan. 29, 1996, now U.S. Pat. No. 5,934,336.

BACKGROUND OF THE INVENTION

The present invention relates to multi-layer tubing for fluid and vapor handling systems. More specifically, it relates to a low cost and high performance flexible multi-layer tubing for use in brake and fuel line systems which has high mechanical and burst strength and low permeation.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and, in cold climates, there is exposure to extremely low temperatures as well.

This abundance of considerations has led to design of tubing assemblies having multiple layers. The materials of each layer have specific, and preferably complementary, properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses a tubing assembly having two coextruded layers of different plastics, and a coextruded layer of adhesive therebetween. The layers are chosen from plastics having complementary properties. U.S. Pat. No. 4,643,927 to Luecke et al. discloses a tubing assembly having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows a multi-layer tubing assembly having an inner fluororubber layer that prevents degradation due to amine-type additives and also exhibits improved adhesion to an outside rubber layer. U.S. Pat. No. 5,038,833 to Brunnhofer discloses a tubing assembly having a protective outer polyamide layer, a middle alcohol barrier layer of polyvinylalcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. No. 3,166,688 to Rowand et al. and U.S. Pat. No. 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multilayer tubing assemblies have usually included at least one permeation-resistant fluoropolymer layer. Difficulties have been encountered, however, in finding a commercially viable design. Multi-layer tubing assemblies utilizing fluoropolymers tend to be rigid and inflexible, particularly at low temperatures. Fluoropolymers having strong mechanical properties typically do not bond well with other non-fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant PVDF layer, and an innermost conductive PVDF layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose a multi-layer coextruded tubing assembly having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact resistance. This is due to the fact that PVDF becomes brittle at low temperatures.

Other high performance fluoropolymers, such as ethylene tetrafluoroethylene (ETFE), exhibit better cold impact resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

Another approach has been to utilize multi-layer tubing assemblies having fluoroelastomer permeation-resistant layers and non-fluoroelastomer cover layers. U.S. Pat. Nos. 4,842,024, 4,905,736, 5,093,166 and 5,346,681 are exemplary. More recently, fluoropolymers have been used as a permeation-resistant layer along with non-fluoroelastomers or polyolefin thermoplastic elastomers as a cover layer. These approaches, however, require a two-step cross-head extrusion process and may also require a vulcanization process. Such processes are expensive and slow, and the mechanical strength and cold impact resistance of the resulting tubing is poor.

Often, there is need for a reinforcement layer in the tubing as well. The art contains numerous examples of multi-layer tubings which include reinforcement layer(s). U.S. Pat. Nos. 4,196,464, 4,330,017 and 4,759,338 disclose reinforced flexible tubings which have a fiber braiding or filament winding between elastomer layers. The fiber braiding and/or filament winding processes used to make these tubings are slow and expensive. Also, use of elastomers entails a time consuming vulcanization process conducted at high temperatures which may be environmentally hazardous.

U.S. Pat. Nos. 5,142,782, 5,142,878 and 5,170,011 disclose reinforced tubings which include a fiber glass braiding layer over a layer of fluoropolymer such as PTFE (polytetrafluoroethylene). The processes involved in making these tubings are also expensive and time consuming, typically involving the multiple steps of: (1) sintering and extruding an inner PTFE tubing layer; (2) applying a braided reinforced glass fiber layer over the inner layer; (3) dispersing a PTFE resin and carrier fluid into the reinforcing layer; and (4) sintering the assembled tubing.

SUMMARY OF THE INVENTION

This invention relates to a multi-layer tubing assembly for use in fuel-line application. The multi-layer tubing assembly comprises an extruded inner layer of thermoplastic, an adhesive layer coextruded around the inner layer and a cover layer of a multiphase polymer coextruded around the adhesive layer. The multiphase polymer forming the cover layer comprises 0.5% to 20% by weight compatibilizers and rheology modifiers.

DETAILED DESCRIPTION OF THE PREFERRED EMBODIMENTS

A first embodiment of the present invention is a four-layer tubing assembly for use in liquid fuel-line applications. It includes an extruded innermost semi-conductive fluoropolymer layer. The fluoropolymer is made semi-conductive by mixing it with 1% to 10% by weight of conductive carbon black. Metallic conductive fillers such as silver, copper or steel may also be utilized. It has a surface resistivity in the range of about $10^3$ to $10^8$ ohm/sq. Suitable fluoropolymers for inner layer include but are not limited to ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylindene, polytetrafluoroethylene, and copolymers, blends and mixtures thereof.

An inner permeation-resistant fluoropolymer layer coextrudable at temperatures below 600 degrees Fahrenheit is coextruded with and surrounds the innermost semi-conductive layer. The importance of this layer being extrudable at temperatures below 600 degrees Fahrenheit resides in the fact that the materials contained in the cover and/or outer layers, such as polyamides, must be extruded at temperatures below 600 degrees Fahrenheit. Temperatures above 600 degrees Fahrenheit may liquefy materials such as polyamides and make them unsuitable for extrusion. Fluoropolymers suitable for the permeation-resistant layer are the same as those fluoropolymers identified as suitable for the semi-conductive layer.

An adhesive layer is coextruded around the inner permeation-resistant layer. The adhesive is a polymer blend or alloy that has a multiphase morphology wherein one phase is compatible or miscible with the fluoropolymer utilized in the inner tubing layers, and another phase is compatible or miscible with the multiphase polymer utilized in the cover layer. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990). Use of polymer blends and alloys having multiphase morphology is also described in the inventor's prior art publications, H. S. -Y. Hsich, Proc. 34$^{th}$ Int. SAMPE Symp., 884 (1989), H. S. -Y. Hsich, J Mater. Sci., 25, 1568 (1990), H. S. -Y. Hsich, Polym. Eng. Sci., 30, 493 (1990).

The material for forming the adhesive layer is a polymer blend or alloy that has a multi-phase morphology wherein one phase is compatible or miscible with fluoropolymer and another phase is compatible or miscible with polyamides. To obtain sufficient bonding between each phase of the adhesive layer with the adjoining layers, at least 25% volume fraction of one phase is miscible with the polymer for forming one of the adjoining layer and at least 25% volume fraction of a second phase is miscible with the polymer for forming the other adjoining layer.

A flexible multiphase polymer cover layer is coextruded around the adhesive layer. The multiphase polymer has at least two glass transition temperatures in which their morphology and property can be manipulated by a thermodynamic process to create the desired damping characteristic. This concept of morphology control through a thermodynamic process to create the desired damping characteristic is also described in the inventor's prior art publications cited above. Suitable multiphase polymers include polymer blends or alloys of polyamides, polyesters, polyurethane and matallocene polyolefins. The flexible multiphase polymer can be formed to be rubber-like without the requirement of vulcanization. These rubber-like multiphase polymers have hardnesses in the range of Shore A 50–98 and tensile strengths in the range of 3000–6000 psi (20–40 MPa). Alternatively, the flexible multiphase polymers can be formed to be plastic-like having higher hardnesses and tensile strengths than the rubber-like multiphase polymers.

A desirable morphology and mechanical properties of the polymer blends or alloys for forming the adhesive layer and the cover layer of multiphase polymers can be further improved by blending two or more immiscible polymers with a compatibilizer which will consequently result in improved adhesive strength. Furthermore, during the coextrusion process of the multi-layer hose or tubing, the Theological properties of the polymer blends or alloys can be properly modified to allow the material for forming the adhesive layer or the cover layer of multiphase polymers to obtain proper viscosity and elasticity to achieve the optimal property for extrusion. Such materials for compatibilizers and rheology modifiers include but are not limited to organomers, organometallics, organophosphates, silanes, acrylate modified polyolefins, acrylate modified fluoropolymers, acrylate derivative modified polyolefins, acrylate derivative modified fluoropolymers, fluoroelastomers and mixtures thereof. To obtain optimal adhesive strength and proper viscosity and elasticity for extrusion, the polymer blends or alloys having a multi-phase morphology should comprise 0.5% to 20% of compatibilizers and rheology modifiers by weight.

The multiphase polymer for forming the outer layer may have a non-foamed structure or a foamed structure. A foamed multiphase polymer offers the tubing assembly the same degree of strengths as a non-foamed multiphase polymer, yet the usage of foamed multiphase polymer for forming the outer layer significantly reduces the weight of the tubing compared to the non-foamed multiphase polymer. This reduction in weight is due to the presence of void spaces in the multiphase polymer formed during the foaming process.

The foaming of the multiphase polymer is caused by the addition of a blowing agent into the multiphase polymer. Examples of such blowing agents include but are not limited to azodicarbonamides, hydrazine derivatives, semi-carbazides, tetrazoles, benzoxazines and mixtures thereof. The blowing agent is mixed with the multiphase polymer just prior to the extrusion process. Following the extrusion of the outer-layer, the blowing agent will cause the multiphase polymer to expand or foam, thus creating void spaces within the outer layer.

A second embodiment of the present invention is a three-layer tubing assembly for use in liquid fuel-line applications. It includes an extruded inner semi-conductive and permeation-resistant fluoropolymer layer. The fluoropolymer is made semi-conductive by mixing it with 1% to 10% by weight of conductive carbon black. It has a surface resistivity in the range of about $10^3$ to $10^8$ ohm/sq. The fluoropolymer can undergo extrusion at temperatures below 600 degrees Fahrenheit. Suitable fluoropolymers are the same as those fluoropolymers identified as suitable in the first embodiment.

An adhesive layer is coextruded around the inner permeation-resistant layer. The adhesive, as in the first embodiment, is a polymer blend or alloy that has a multiphase morphology wherein one phase is compatible or miscible with the utilized fluoropolymer, and another phase is compatible or miscible with the utilized multiphase polymer. A multiphase polymer cover layer is coextruded around the adhesive layer. Suitable multiphase polymers are the same as those identified as suitable for the first embodiment.

A third embodiment of the present invention is a three-layer tubing assembly for use in vapor fuel-line applications. It includes an extruded inner permeation-resistant fluoropolymer layer. The fluoropolymer is extrudable at temperatures below 600 degrees Fahrenheit. Suitable fluoropolymers are the same as those identified above.

An adhesive layer is coextruded around the inner permeation-resistant layer. The adhesive, as in the first and second embodiments, is a polymer blend or alloy that has a multiphase morphology wherein one phase is compatible or miscible with fluoropolymer and another phase is compatible or miscible with a multiphase polymer.

A multiphase polymer cover layer is coextruded around the adhesive layer. Suitable multiphase polymers are the same as those identified above.

A fourth embodiment of the present invention is a four-layer tubing assembly for use in vapor fuel-line applications. The fourth embodiment is the same as the third embodiment but includes an additional, outermost plastic layer. Suitable plastics for this outermost layer include polyamides and polyesters.

The fifth embodiment of the present invention comprises a reinforced flexible tubing including an inner layer of fluoropolymer, a reinforcing fabric ribbon layer and a cover layer. Suitable fluoropolymers for the inner layer include but are not limited to ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylindene, polytetrafluoroethylene, and copolymers, blends and mixtures thereof.

The cover layer may be comprised of the same material as the inner layer or it may be comprised of multiphase polymers. The multiphase polymers for forming the cover layer are the same as those multiphase polymers identified as suitable for forming the cover layer in the first embodiment.

A reinforcing fabric ribbon layer is disposed between the inner layer and cover layer. The tubing is manufactured by simultaneously wrapping the reinforcing fabric ribbon and extruding the cover layer around the inner fluoropolymer tubing layer. Expensive and time consuming prior art process steps such as braiding, dispersing binders or adhesive, sintering or vulcanization are not needed.

A sixth embodiment of the present invention is a three-layer tubing assembly for use in liquid fuel-line applications. It includes an extruded inner conductive and permeation-resistant metallic layer. Suitable metals for forming the metallic layer include but are not limited to copper, aluminum or aluminum alloy. The molten metal, or the utilized metal in its liquid state, is extruded to form the metallic layer.

After the metallic layer has been sufficient cooled, a thermoplastic protective layer is extruded around the metallic layer. Suitable thermoplastics for the protective layer include but are not limited to polyamides and polyesters. A multiphase polymer cover layer is coextruded around the thermoplastic protective layer. Suitable multiphase polymers for forming the cover layer are the same as those identified as suitable for forming the cover layer in the first embodiment.

A seventh embodiment of the present invention is a two-layer tubing assembly for use in vapor fuel-line applications. It includes an extrudable inner permeation-resistant thermoplastic layer. Suitable thermoplastics for forming the inner layer include but are not limited to fluoropolymers, polyamides, polyester, polyurethanes, polyvinyl chloride, polyketones, polyolefins and mixtures thereof.

A multiphase polymer cover layer, capable of bonding to the thermoplastic inner layer, is coextruded around the thermoplastic layer. Suitable multiphase polymers for forming the cover layer are the same as those identified for forming the cover layer in the first embodiment.

An eighth embodiment of the present invention is a three-layer tube assembly for use in vapor fuel-line applications. It includes an innermost layer of nanocomposite, a middle layer of adhesive and a cover layer of multiphase polymer.

Polymer nanocomposites are the combination of a polymer matrix resin and inorganic particles. The resulting nanocomposite particle has at least one dimension (i.e., length, width or thickness) in the nanometer size range.

The benefits of using nanocomposites for forming the inner layer include efficient reinforcement with minimum loss of ductility and impact strength, heat stability, flame resistance, improved gas barrier properties, improved abrasion resistance, reduced shrinkage and residual stress, altered electronic and optical properties. The benefits of using nanocomposites for forming the inner layer result from the compactness of the nanocomposite particles. For instance, since the particles are very small, the voids between the particles are also very small, thus reducing gas leakage through the wall of the tubing formed of nanocomposite.

A number of inorganic particles can be used for forming the nanocomposite. Such inorganic particles include but are not limited to clay and montmorillonite. The use of clay for forming the nanocomposite is preferred since clay is the inorganic particle easiest to work with. To obtain the desirable properties of the nanocomposite, should clay be used as the inorganic particles, the nanocomposite should comprise 0.1% to 10% of clay by weight.

A wide variety of polymers can be used as the matrix resins for forming the nanocomposites. The polymer which can used as the matrix resins include but are not limited to polyamides, polystyrene, polyetherimide, acrylate and methacrylate oligomers, polymethyl methacrylate, polyproylene, polyethylene oxide, epoxy, polyimide, unsaturated polyester and mixtures thereof.

An adhesive layer is coextruded around the inner layer of nanocomposite. The adhesive, as in the first embodiment, is a polymer blend or alloy that has multiphase morphology wherein one phase is compatible or miscible with the nanocomposite forming the inner layer and another phase is compatible or miscible with the multiphase polymer forming the cover layer.

A multiphase polymer cover is coextruded around the adhesive layer. Suitable multiphase polymers are the same as those identified in the first embodiment.

A ninth embodiment of the present invention is a three-layer tube assembly for use in vapor fuel-line applications. It includes an inner layer of nanocomposite, a middle layer of adhesive and a cover layer of thermoplastic. Suitable nanocomposites for forming the inner layer are the same as those identified as suitable for the eighth embodiment.

An adhesive layer is coextruded around the inner layer of nanocomposite. The adhesive, as in the first embodiment, is a polymer blend or alloy that has multiphase morphology wherein one phase is compatible or miscible with the nanocomposite forming the inner layer and another phase is compatible or miscible with the thermoplastic forming the cover layer.

A cover layer of thermoplastic is coextruded around the adhesive layer. Suitable thermoplastics for forming the cover layer include but are not limited to fluoropolymers, polyamides, polyester, polyurethanes, polyvinyl chloride, polyketones, polyolefins and mixtures thereof. The thermoplastic can be formed having a non-foamed structure or a foamed structure. The process for foaming the thermoplastic is the same process for foaming the multiphase polymer as disclosed in the first embodiment.

A tenth embodiment of the present invention is a two-layer tubing assembly for use in vapor fuel-line applications. It includes an inner layer of nanocomposite. Suitable nanocomposites for forming the inner layer are the same as those identified for the eighth embodiment.

A multiphase polymer cover layer, capable of bonding to the nanocomposite for forming the inner layer, is coextruded around the inner layer. Suitable multiphase polymers for forming the cover layer are the same as those identified as suitable for forming the cover layer in the first embodiment.

The multi-layer tubing of the above embodiments may be formed as a tubing having a constant diameter throughout the length of the tubing or a tubing defined by at least one corrugated region located in its length to accommodate bending, flexing or twisting. The multi-layer tubing with localized corrugated regions can be produced by a process in which linear tubing material having multiple laminated layers is formed by co-extrusion and is molded to provide the corrugation and contour desired.

Various features of the present invention have been described with reference to the above embodiments. It should be understood that modification may be made without departing from the spirit and scope of the invention as represented by the following claims.

What is claimed is:

1. A multi-layer tubing assembly comprising:
    an extruded inner layer of thermoplastic;
    an adhesive layer coextruded around said inner layer; and
    a cover layer of a multiphase polymer coextruded around said adhesive layer;
    wherein said multiphase polymer forming said cover layer comprises 0.5% to 20% by weight compatibilizers and rheology modifiers.

2. A tubing assembly as claimed in claim 1 wherein said compatibilizer and rheology modifier is selected from a group consisting of organometallics, organolphosphates, silanes, acrylate modified polyolefins, acrylate derivative modified polyolefins and mixtures thereof.

3. A tubing assembly as claimed in claim 1 wherein said thermoplastic forming said inner layer is selected from a group consisting of fluoropolymers, polyamides, polyesters, polyurethanes, polyvinyl chloride, polyketones, polyolefins and mixtures thereof.

4. A tubing assembly as claimed in claim 3 wherein said fluoropolymer is selected from a group consisting of ethylene tetrafluoroethylene, terpolymers of tetrafluoroethylene, hexafluoropropylene, perfluoromethyvinylether, cholorotrifuoroethylene, ethylene chlorotrifluoroethylene, tetrafluoroethylene hexafluoropropylene vinylidene, perfluroralkoxy and polyvinylidene fluoride.

5. A tubing assembly as claimed in claim 1 wherein said adhesive layer is a polymer blend having a multiphase morphology wherein one phase is miscible with said thermoplastic forming said inner layer and another phase is miscible with said multiphase polymer forming said cover layer.

6. A tubing assembly as claimed in claim 1 wherein said multiphase polymer forming said cover layer comprises a polymer selected from a group consisting of copolymers, polymer blends and alloys of polyamides, polyesters, polyurethanes, polyvinyl chloride, polyolefins, polybutylene terephthalate, polyethylene terephthalate and polyalkylene naphthalate.

7. A tubing assembly as claimed in claim 1 wherein said multiphase polymer forming said cover layer has a foamed structure.

8. A tubing assembly as claimed in claim 1 wherein said inner layer has a surface resistivity in the range of $10^3$ to $10^8$ ohm/sq.

9. A multi-layer tubing assembly comprising:
    an extruded inner layer of thermoplastic;
    an adhesive layer coextruded around said inner layer; and
    a cover layer of a multiphase polymer coextruded around said adhesive layer.

10. A tubing assembly as claimed in claim 9 wherein said multiphase polymer comprises a polymer selected from a group consisting of copolymers, polymer alloys and polymer blends of polyamides, polyesters, polyurethane, polyvinyl chloride, polyolefins, polybutylene terephthalate, polyethylene terephthalate and polyalkylene naphthalate.

11. A tubing assembly as claimed in claim 9 wherein thermoplastic forming said inner layer is selected from a group consisting of fluoropolymers, polyamides, polyesters, polyurethanes, polyvinyl chloride, polyketones, polyolefins and mixtures thereof.

12. A tubing assembly as claimed in claim 11 wherein said fluoropolymer is selected from a group consisting of ethylene tetrafluoroethylene, terpolymers of tetrafluoroethylene, hexafluoropropylene, perfluoromethyvinylether, cholorotrifuoroethylene, ethylene chlorotrifluoroethylene, tetrafluoroethylene hexafluoropropylene vinylidene, perfluroralkoxy and polyvinylidene fluoride.

13. A tubing assembly as claimed in claim 9 wherein said adhesive layer is comprised of a polymer blend having a multiphase morphology wherein one phase is miscible with said thermoplastic forming said inner layer and another phase is miscible with said multiphase polymer forming said cover layer.

14. A tubing assembly as claimed in claim 9 wherein said multiphase cover layer having a foamed structure.

15. A tubing assembly as claimed in claim 9 defining at least one corrugated region.

16. A multi-layer tubing assembly comprising:
an extruded metallic inner layer;
a protective layer of thermoplastic extruded around said metallic inner layer; and
a cover layer of multiphase polymer extruded around said protective layer.

17. A tubing assembly as claimed in claim 16 wherein said multiphase polymer forming said cover layer comprises 0.5% to 20% by weight compatibilizers and rheology modifiers.

18. A tubing assembly as claimed in claim 17 wherein said compatibilizer and rheology modifier is selected from a group consisting of organometallics, organolphosphates, silanes, acrylate modified polyolefins, acrylate derivative modified polyolefins and mixtures thereof.

19. A tubing assembly as claimed in claim 16 wherein said metal forming said metallic inner layer is selected from a group consisting of copper, aluminum and aluminum alloy.

20. A tubing assembly as claimed in claim 16 wherein said multiphase polymer forming said cover layer comprises a polymer selected from a group consisting of copolymers, polymer alloys and polymer blends of polyamides, polyesters, polyurethane, polyvinyl chloride, polyolefins, polybutylene terephthalate, polyethylene terephthalate and polyalkylene naphthalate.

21. A tubing assembly as claimed in claim 16 wherein said multiphase polymer forming said cover layer has a foamed structure.

22. A multi-layer tubing assembly comprising:
an inner layer of nanocomposite;
a layer of adhesive extruded around said inner; and
a cover layer extruded around said layer of adhesive.

23. A tubing assembly as claimed in claim 22 wherein said nanocomposite is a mixture of a polymer matrix resin and inorganic particles.

24. A tubing assembly as claimed in claim 23 wherein said polymer matrix resin is selected from a group comprising polyesters, polyamides, polyolefins, polyketones and mixtures thereof.

25. A tubing assembly as claimed in claim 23 wherein said inorganic particle is clay.

26. A tubing assembly as claimed in claim 25 wherein said nanocomposite comprises 0.1% to 10% by weight clay.

27. A tubing assembly as claimed in claim 22 wherein said cover layer is extruded multiphase polymer.

28. A tubing assembly as claimed in claim 27 wherein said multiphase polymer comprises a polymer selected from a group consisting of copolymers, polymer alloys and polymer blends of polyamides, polyesters, polyurethane, polyvinyl chloride, polyolefins, polybutylene terephthalate, polyethylene terephthalate and polyalkylene naphthalate.

29. A tubing assembly as claimed in claim 22 wherein said cover layer is extruded thermoplastic.

30. A multi-layer tubing assembly comprising:
an extruded inner layer of thermoplastic;
an outer layer of multiphase polymer coextruded around said inner layer; and
wherein said multiphase polymer is bonded to said thermoplastic.

31. A tubing assembly as claimed in claim 30 wherein said thermoplastic is selected from a group consisting of fluoropolymers, polyamides, polyesters, polyurethanes, polyvinyl chloride, polyketones, polyolefins and mixtures thereof.

32. A tubing assembly as claimed in claim 30 wherein said multiphase polymer comprises 0.5% to 20% by weight compatibilizer and rheology modifier.

33. A tubing assembly as claimed in claim 32 wherein said compatibilizer and rheology modifier is selected from a group consisting of organometallics, organolphosphates, silanes, acrylate modified polyolefins, acrylate derivative modified polyolefins and mixtures thereof.

34. A multi-layer tubing assembly comprising:
an extruded inner layer of nanocomposite;
an outer layer of multiphase polymer coextruded around said inner layer; and
wherein said multiphase polymer is bonded to said nanocomposite.

35. A tubing assembly as claimed in claim 34 wherein said multiphase polymer comprises 0.5% to 20% by weight compatibilizer and rheology modifier.

36. A tubing assembly as claimed in claim 35 wherein said compatibilizer and rheology modifier is selected from a group consisting of organometallics, organolphosphates, silanes, acrylate modified polyolefins, acrylate derivative modified polyolefins and mixtures thereof.

37. A multi-layer tubing assembly comprising:
an inner layer of conductive polymer;
a middle layer of nanocomposite; and
a cover layer of polymer extruded around said middle layer of nanocomposite.

38. A tubing assembly as claimed in claim 37 wherein said nanocomposite is a mixture of a polymer matrix resin and inorganic particles.

39. A tubing assembly as claimed in claim 38 wherein said polymer matrix resin is selected from a group comprising polyesters, polyamides, polyolefins, polyketones and mixtures thereof.

40. A tubing assembly as claimed in claim 38 wherein said inorganic particle is clay.

41. A tubing assembly as claimed in claim 40 wherein said nanocomposite comprises 0.1% to 10% by weight clay.

42. A tubing assembly as claimed in claim 37 wherein said outer layer polymer comprises a polymer selected from a group consisting of copolymers, polymer alloys and polymer blends of polyamides, polyesters, polyurethane, polyvinyl chloride, polyolefins, polybutylene terephthalate, polyethylene terephthalate and polyalkylene naphthalate.

43. A tubing assembly as claimed in claim 37 wherein said conductive polymer has a surface conductivity of $10^3$ to $10^8$ ohm/sq.

44. A multi-layer tubing assembly comprising:
an extruded inner layer of thermoplastic;
an adhesive layer of multiphase polymer coextruded around said inner layer; and
an outer polymer layer.

45. A tubing assembly as claimed in claim 44 wherein said thermoplastic is selected from a group consisting of fluoropolymers, polyamides, polyesters, polyurethanes, polyvinyl chloride, polyketones, polyolefins and mixtures thereof.

46. A tubing assembly as claimed in claim 44 wherein said multiphase polymer comprises 0.5% to 20% by weight compatibilizer and rheology modifier.

47. A tubing assembly as claimed in claim 46 wherein said compatibilizer and rheology modifier is selected from a group consisting of organometallics, organolphosphates, silanes, acrylate modified polyolefins, acrylate derivative modified polyolefins and mixtures thereof.

48. A tubing assembly as claimed in claim 45 wherein said fluoropolymer is selected from a group consisting of ethylene tetrafluoroethylene, terpolymers of tetrafluoroethylene, hexafluoropropylene, perfluoromethyvinylether, cholorotrifuoroethylene, ethylene chlorotrifluoroethylene, tetrafluoroethylene hexafluoropropylene vinylidene, perfluroralkoxy and polyvinylidene fluoride.

49. A multi-layer tubing assembly comprising:

an extruded layer of nanocomposite;

an outer layer of multiphase polymer coextruded around said layer of nanocomposite; and wherein said multiphase polymer is bonded to said nanocomposite.

50. A tubing assembly as claimed in claim 49 wherein said multiphase polymer comprises 9.5% to 20% by weight compatibilizer and rheology modifier.

51. A tubing assembly as claimed in claim 50 wherein said compatibilizer and rheology modifier is selected from a group consisting of organometallics, organolphosphates, silanes, acrylate modified polyolefins, acrylate derivative modified polyolefins and mixtures thereof.

* * * * *